March 22, 1966  KAZUMASA MIWA ETAL  3,242,400
MINIATURE VARIABLE CAPACITORS

Filed Aug. 26, 1964

INVENTOR.
Kazumasa Miwa
Shozo Uchida

BY

Mason & Mason

March 22, 1966  KAZUMASA MIWA ETAL  3,242,400
MINIATURE VARIABLE CAPACITORS
Filed Aug. 26, 1964  2 Sheets-Sheet 2

INVENTOR.
Kazumasa Miwa
Shozo Uchida

BY

Mestern & Mestern

_United States Patent Office_

3,242,400
Patented Mar. 22, 1966

3,242,400
MINIATURE VARIABLE CAPACITORS
Kazumasa Miwa, Ota-ku, Tokyo-to, and Shozo Uchida, Kawagoe-shi, Japan, assignors to Toko Kabushiki Kaisha, Tokyo-to, Japan, a joint-stock company of Japan
Filed Aug. 26, 1964, Ser. No. 392,109
Claims priority, application Japan, Sept. 2, 1963 (utility model), 38/66,267; Sept. 4, 1963 (utility model), 38/66,615; Dec. 4, 1963 (utility model), 38/90,649; Dec. 6, 1963 (utility model), 38/91,184
6 Claims. (Cl. 317—249)

This invention relates to improvements in variable capacitors of miniature size for use in small portable radio sets, and more particularly to a novel rotary or movable electrode assembly used in such capacitors.

Conventional variable capacitors usually have a ceramic plate as a dielectric, and a rotor consisting of a circular disc made of an insulating material, e.g., a synthetic resin, and a semicircular metal plate bonded to one half of the surface of the disc. The sliding surface then is finished by lapping to attain flat surfaces. However, this does not eliminate distortion of the sliding surface owing to differences between the respective temperature coefficients of the metal and the insulator, so that a gap occurs between the rotor and the ceramic plate. This gap is not uniform and varies with the angle of rotation. Even if this variation is very slight, the capacitance between the electrodes varies greatly because of the higher dielectric constant of the ceramic plate so that the characteristics of the capacitor are unstable.

Another problem to be solved is to decrease friction between the rotor and the stator or stationary electrode member. As is well known in the art, a lubricating oil film is commonly used between the rotor and the stator in order to decrease the friction between these members, but the capacitance between the electrodes is affected by the viscosity or thickness of the oil film with variations in temperature. Moreover, oozing out of the oil also decreases the thickness of the oil film, thereby causing the same trouble.

Accordingly, it is one of the objects of this invention to provide a novel movable electrode plate for use in variable capacitors of small size in which all of the defects mentioned above are eliminated.

Another object of this invention is to provide a novel variable capacitor of small size whose electrical characteristics are not affected by the difference of physical properties of the metallic and insulating components of the capacitor, nor by temperature variation.

Still another object of this invention is to provide an improved metal electrode which can slide with small friction with respect to the stationary electrode.

A further object of this invention is to provide an improved metal electrode for variable capacitors which does not require frequent lubrication.

Briefly stated, in accordance with this invention, the rotor assembly of a variable capacitor is comprised of a substantially semicircular metal plate member and a substantially semicircular insulator plate member which permits said members to have slight relative movement. In one embodiment of the invention, these members are connected to each other by a thin resilient plate disposed on their backs. In another embodiment of the invention, said semicircular members are interconnected by means of flexible joints, and in a still further modification, the metal plate member is loosely fitted in an opening or window provided for the insulator plate member and resiliently urged against the latter by a spring plate.

According to another feature of this invention, the metal plate member is made of a sintered porous metal plate impregnated with lubricating oil.

While the specification concludes with claims particularly pointing out and distinctly claiming the subject matter of this invention which are regarded as the invention, it is believed that the invention will be better understood from the following description taken in connection with the accompanying drawings in which like parts are designated by like reference characters, and in which:

Figure 1:
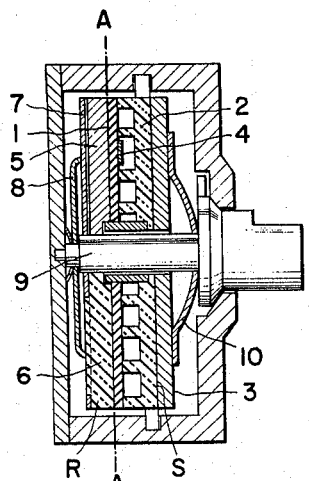
FIG. 1 is a sectional view of a small variable capacitor utilizing a movable electrode plate constructed in accordance with this invention.
Figure 2:
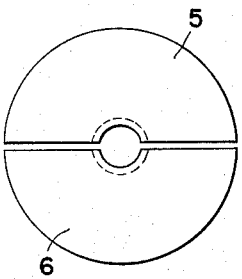
FIG. 2 is a plan view of the electrode plate.
Figure 3:
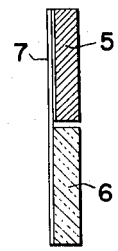
FIG. 3 is a side elevation of the electrode plate.

Referring now to FIG. 1 of the accompanying drawings, there is shown a cross section of a variable capacitor comprising a stator S including a ceramic plate 1 functioning as the dielectric material of the capacitor, a supporting member 2 therefor, a clamping plate 3, and a stationary electrode 4 printed on the back of the ceramic plate 1. The rotor assembly R of the capacitor comprises a semicircular electrode plate 5, a semicircular insulator plate 6, and a resilient plate 7 adapted to interconnect the plates 5 and 6 to form a unitary disc which is secured to a rotary shaft 9 through a mounting fixture 7. As shown in FIG. 1 the ceramic disc 1 is urged to engage the rotary disc along a plane A—A by means of a cup shaped spring 10.

Figure 4:
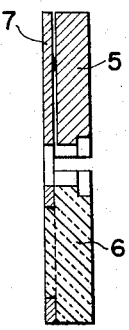
FIG. 4 is a cross sectional view of the electrode plate.

In order to eliminate the various difficulties mentioned above of the variable capacitor of prior art, in accordance with this invention the rotor assembly R comprises a separate electrode plate 5 and an insulator plate 6 (made of synthetic resin, for instance) which can move independently. These plates 5 and 6 are interconnected by a resilient annular member 7 made of metal or the like to form a unitary circular disc with the surfaces of the plates 5 and 6 in vertical alignment, as shown in FIG. 4.

Figure 5:
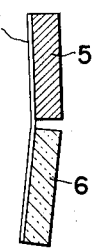
FIG. 5 is another side view of the electrode plate to explain the operation thereof.

By connecting together the plates 5 and 6 with the resilient plate 7, said plates 5 and 6 can move relatively, the extreme condition being shown by FIG. 5.

Figure 6:
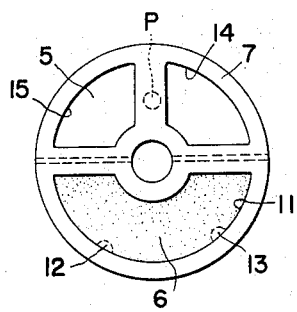
FIG. 6 is a bottom view of the electrode plate.
Figure 7:
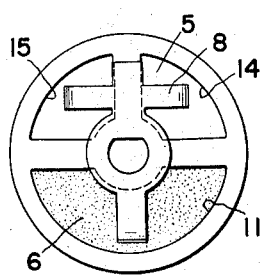
FIG. 7 is a bottom view of the electrode plate with a mounting fixture assembled thereon.

It is advantageous or desirable to connect the electrode plate 5 and the insulator plate 6 to the resilient plate 7 at limited areas or portions thereof in order to permit said plates to have a certain degree of freedom with respect to the plate 7. For example, as shown in FIG. 6, the electrode plate 5 may be bonded to the resilient plate 7 at one point P by any suitable means such as soldering, welding, or brazing, while the insulator plate 6 is fitted within a window 11 provided on the resilient plate 7 and mechanically anchored therein at two points 12 and 13. Even when the surface of one side respectively of the electrode plate 5 and the insulator plate 6 is wholly bonded to the resilient plate 7, the objects of this invention can be attained by virtue of the resiliency of the plate 7.

As best shown in FIG. 6, the resilient plate 7 is formed with a plurality of windows 11, 14 and 15 through which the mounting fixture 8 can urge the electrode plate 5 and the insulator plate 6 against the ceramic plate 1.

Thus, according to this invention the eletrode metal plate 5 and the insulator plate 6 are independent, so that any tendency of their mutual interference due to the difference in their physical characteristics and variation in the electrical characteristics of the capacitor on account of changes in the ambient temperature as well as other ambient conditions can be minimized. Furthermore, since the electrode plate 5 and the insulator plate 6 are separately urged against the ceramic plate, they are always pressed against the ceramic plate under uniform contact pressure irrespective of the difference in their thicknesses caused by wear.

Moreover, it is very easy to manufacture this capacitor because the plates 5 and 6 can be finished independently and any slight misalignment of their sliding surfaces can be absorbed by the resilient plate 7, thus enabling said sliding surfaces to uniformly contact the ceramic plate.

As has been pointed out hereinabove, it is advantageous to make the electrode metal plate of a suitable sintered metal impregnated with lubricating oil in order to obviate the necessity of frequent lubrication. In order to decrease friction at the sliding surface A between the rotor and stator, it has been the practice to form a thin oil film on the surface A. But as the viscosity and hence the thickness of the oil film varies with the ambient temperature, the electrostatic capacitance between the rotor and stator will also be changed. Moreover, the thickness of the oil film may decrease owing to oozing thereof out of the sliding surface. However, use of oil-impregnated sintered metal assures the provision of a thin oil film of constant thickness, thus eliminating the above-mentioned defects.

Figure 8:
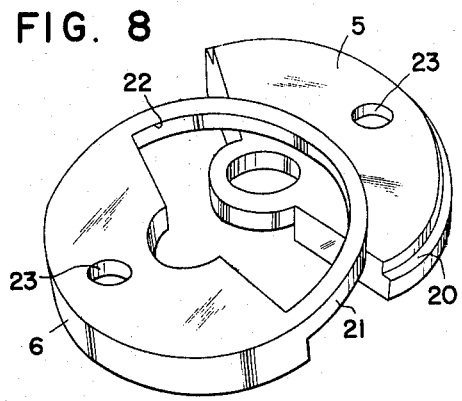
FIG. 8 is an exploded perspective view of a modified electrode plate.
Figure 9:
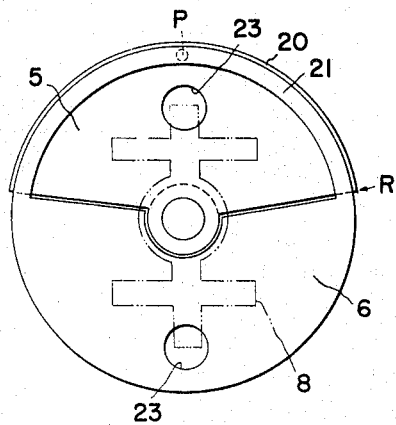
FIG. 9 is a bottom view of the electrode plate shown in FIG. 8 after assembling.

In a modification shown in FIGS. 8 and 9, the electrode plate 5 is of a sector shape and is provided with a circumferential shoulder 20. The insulator plate 6 has a semicircular strip 21 which defines a sector-shaped window 22 adapted to receive the metal plate 20, as shown in FIG. 5. Each of the plates 5 and 6 is provided with a perforation 23 to receive each end of a resilient mounting fixture 8. To increase the mechanical strength of the strip 21, the axial depth thereof is tapered toward the insulator plate as can be seen from FIG. 8 and the shoulder 20 is also tapered accordingly. Again, it is preferable to join the metal plate 5 to the insulator plate 6 at only one point P to increase the freedom of relative movement between these plates.

Figure 10:
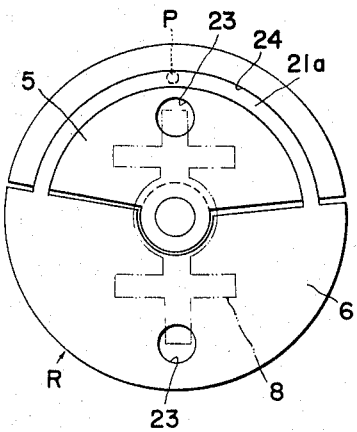
FIG. 10 is a bottom view of another embodiment of this invention.
Figure 11:
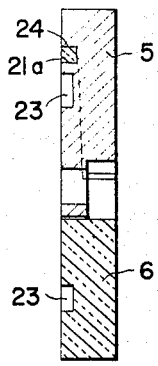
FIG. 11 is a cross sectional view of the electrode plate shown in FIG. 10.

While in the embodiment shown in FIGS. 8 and 9 the strip 21 has the same outer diameter as the insulator plate 6 to completely surround the metal plate 5, the diameter of the strip 21 can be made smaller. Thus, in the modification shown in FIGS. 10 and 11, the diameter of a strip $21_a$, integral with the insulator plate 6, is made smaller than those of plates 5 and 6, and the metal plate 5 is formed with a groove 24 to receive the strip $21_a$. The plates 5 and 6 are connected to each other by a resilient mounting fixture 8. The resilient mounting fixture 8 provides the functions of the resilient plate 7 of the first embodiment shown in FIGS. 1 to 7 to permit slight relative movement between plates 5 and 6.

Figure 12:
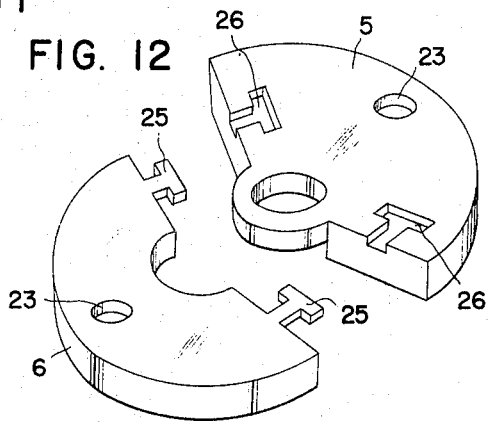
FIG. 12 is an exploded perspective view of still another modification of this invention.
Figure 13:
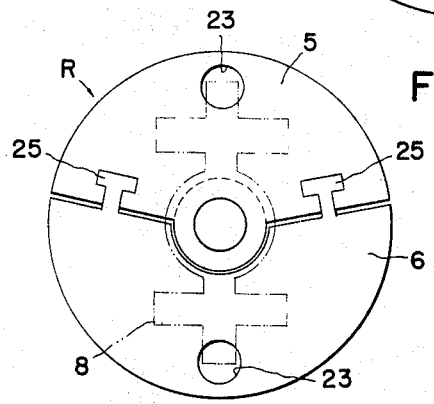
FIG. 13 is a plan view of an assembly of the electrode plate shown in FIG. 12.

In a still further embodiment shown in FIGS. 12 and 13, a substantially semicircular electrode plate 5 and an insulator plate 6 are resiliently interconnected by flexible shaped tongues 25 and conjugate grooves 26. Such jointing fixtures may take various forms provided that they are sufficiently resilient to provide required relative movement between the plates 5 and 6. The tongues 25 may be secured in the grooves 26 by any suitable means such as cementing, welding or brazing.

As can be observed from the foregoing disclosures this invention provides a cheap, rigid, and accurate rotor assembly for small variable capacitors which can maintain its accuracy without frequent lubrication and regardless of the change in the surrounding temperature.

In accordance with the provisions of the patent statutes, we have explained the principle and operation of our invention and we have illustrated and disclosed what we consider to represent the best embodiment thereof. However, we desire to have it understood that within the scope of the appended claims, the invention may be practiced otherwise than as specifically illustrated and described.

What is claimed is:

1. A variable capacitor comprising a stationary ceramic plate functioning as dielectric material, a metal electrode secured on one side of said ceramic plate, a rotor assembly cooperating with said ceramic plate and including a substantially semicircular electrode metal plate, a substantially semicircular insulator plate, and means to resiliently interconnect said metal electrode and insulator plate so as to permit them to move independently of each other relative to their common axis; means to resiliently urge said rotor assembly against the opposite side of said ceramic plate, and a shaft connected to said rotor assembly to slidably rotate it with respect to said ceramic plate.

2. The variable capacitor according to claim 1 wherein said electrode metal plate and insulator plate of the rotor assembly are interconnected by an annular resilient connecting member which is connected thereto at limited areas.

3. The variable capacitor according to claim 1 wherein the electrode metal plate of said rotor assembly is a porous sintered metal or alloy impregnated with lubricating oil.

4. The variable capacitor according to claim 1 wherein said rotor assembly comprises a sector shaped electrode metal plate, a conjugate sector shaped insulator plate, an arcuate strip which is integral with said insulator plates and defines a window receiving said metal plate, a groove in said metal plate receiving said arcuate strip, and means resiliently interconnecting said metal plate and insulator strip.

5. The variable capacitor according to claim 4 wherein the axial thickness of said arcuate strip and said groove is tapered toward said insulator plate.

6. The variable capacitor according to claim 1 wherein said electrode metal plate and said insulator plate are interconnected by resilient tongues.

References Cited by the Examiner
UNITED STATES PATENTS
3,175,134  3/1965  Matsui _____ 317—249

ROBERT K. SCHAEFER, *Primary Examiner.*

JOHN F. BURNS, *Examiner.*

D. J. BADER, *Assistant Examiner.*